US012656083B1

(12) United States Patent
Li

(10) Patent No.: US 12,656,083 B1
(45) Date of Patent: Jun. 16, 2026

(54) LASER BORESIGHTER AND FIREARM CALIBRATION SYSTEM

(71) Applicant: Beijing Huihaozi Technology Co., Ltd., Beijing (CN)

(72) Inventor: Huicai Li, Beijing (CN)

(73) Assignee: Beijing Huihaozi Technology Co., Ltd., Beijing (CN)

( * ) Notice: Subject to any disclaimer, the term of this patent is extended or adjusted under 35 U.S.C. 154(b) by 0 days.

(21) Appl. No.: 19/335,143

(22) Filed: Sep. 22, 2025

(51) Int. Cl.
 *F41G 1/54* (2006.01)
 *H02J 7/70* (2026.01)

(52) U.S. Cl.
 CPC ................ *F41G 1/545* (2013.01); *H02J 7/70* (2026.01)

(58) Field of Classification Search
 CPC ............. F41G 1/54; F41G 1/545; F41A 21/32
 See application file for complete search history.

(56) References Cited

U.S. PATENT DOCUMENTS

| | | | | |
|---|---|---|---|---|
| 4,825,258 A | * | 4/1989 | Whitson | F41G 1/54 |
| | | | | 33/286 |
| 4,879,814 A | * | 11/1989 | Wallace | F41G 3/323 |
| | | | | 89/200 |
| 5,001,836 A | * | 3/1991 | Cameron | F41G 1/54 |
| | | | | 42/116 |
| 5,365,669 A | * | 11/1994 | Rustick | F41A 33/02 |
| | | | | 42/134 |
| 5,448,834 A | * | 9/1995 | Huang | F41G 1/545 |
| | | | | 279/2.12 |
| 6,289,624 B1 | * | 9/2001 | Hughes | F41G 1/545 |
| | | | | 42/116 |
| 6,295,753 B1 | * | 10/2001 | Thummel | F41A 33/02 |
| | | | | 42/116 |
| 6,397,509 B1 | * | 6/2002 | Langner | F41G 1/54 |
| | | | | 42/114 |
| 6,421,947 B1 | * | 7/2002 | Fuller | F41G 1/545 |
| | | | | 42/116 |
| 8,132,354 B1 | * | 3/2012 | Sellers | F41G 1/54 |
| | | | | 42/116 |
| 8,510,981 B1 | * | 8/2013 | Ganther | F41G 1/545 |
| | | | | 42/121 |

(Continued)

FOREIGN PATENT DOCUMENTS

EP 0773422 B1 * 1/2002 ............. F41G 3/323

OTHER PUBLICATIONS https://www.youtube.com/watch?v=XbCR-S4HL0Y&t=24s, Jul. 1, 2024 "First impressions of the FocuAim USB Recharable Laser Bore Sight Kit".*

*Primary Examiner* — Benjamin P Lee
(74) *Attorney, Agent, or Firm* — ScienBiziP, P.C.

(57) ABSTRACT

A laser boresighter and firearm calibration system are provided. The laser boresighter includes a main body, a laser light generator and a cover, the main body includes a power supply module, a USB male connector and a control board, the control board is received in the main body and electrically connected to the power supply module, one end of the USB male connector is received in the main body and is electrically connected to the control board, and another end of the USB male connector protrudes outside the main body and is configured for directly connecting to a female connector of an external power supply; the laser light generator connects to the main body and is configured to emit laser beams, the cover covers the USB male connector of the main body.

19 Claims, 6 Drawing Sheets

(56)      References Cited

U.S. PATENT DOCUMENTS

| | | | | |
|---|---|---|---|---|
| 8,661,725 B1 * | 3/2014 | Ganther | ............... | F41G 1/545 |
| | | | | 42/121 |
| 10,317,172 B1 * | 6/2019 | Morgan | ............... | F41G 1/545 |
| 10,877,373 B2 * | 12/2020 | Baker | ............ | G02B 17/0663 |
| D927,632 S * | 8/2021 | Li | ............... | D22/108 |
| D927,633 S * | 8/2021 | Li | ............... | D22/108 |
| 12,173,988 B2 * | 12/2024 | Rudolph | ............... | F41G 1/545 |
| 2007/0144051 A1 * | 6/2007 | Moore | ............... | F41G 1/54 |
| | | | | 42/116 |
| 2007/0169392 A1 * | 7/2007 | Davis | ............... | F41G 3/323 |
| | | | | 42/120 |
| 2012/0167440 A1 * | 7/2012 | StPhillips | ............ | F41A 21/32 |
| | | | | 42/116 |
| 2015/0198418 A1 * | 7/2015 | Woida-O'Brien | ... | G03H 1/0005 |
| | | | | 359/9 |
| 2019/0011225 A1 * | 1/2019 | Sun | ............... | F41G 1/545 |
| 2019/0137210 A1 * | 5/2019 | Moore | ............... | F41G 3/323 |
| 2020/0081342 A1 * | 3/2020 | Baker | ............... | F41G 1/54 |
| 2020/0271416 A1 * | 8/2020 | Knupple, Jr. | ......... | F41G 1/54 |
| 2021/0270571 A1 * | 9/2021 | Oliver | ............... | F41G 1/35 |
| 2023/0324142 A1 * | 10/2023 | Rudolph | ............... | F41G 1/545 |
| | | | | 42/134 |
| 2024/0053124 A1 * | 2/2024 | Kroeger | ............... | F41G 1/545 |

* cited by examiner

200

LASER BORESIGHTER AND FIREARM CALIBRATION SYSTEM

TECHNICAL FIELD

The present invention relates to the technical field of firearm calibration technology, and in particular relates to a laser boresighter and a firearm calibration system using the laser boresighter.

BACKGROUND

A laser boresighter is installed inside a gun barrel and acts as a laser calibration device to calibrate a trajectory of bullets after the bullets are fired from the gun barrel, thereby improving a shooting accuracy of the bullets.

The laser boresighter includes a built-in battery. When the built-in battery of the laser boresighter runs out of power, the battery can be recharged by plugging an accompanying charging cable into a socket or other power supply devices (such as a power bank or a computer's USB port). After the built-in battery is fully charged, the charging cable is detached from the laser boresighter.

However, once the charging cable breaks down, the laser boresighter is unable to recharge unless to repair or replace the charging cable.

BRIEF DESCRIPTION OF DRAWINGS

In order to illustrate the technical solution in embodiments of the present invention more clearly, the following briefly introduces accompanying drawings used in the description of the embodiments. Obviously, the accompanying drawings in the following description are only some embodiments of the present invention. Those of ordinary skill in the art can obtain other accompanying drawings from these accompanying drawings without any creative efforts.

DETAILED DESCRIPTION

Figure 1:
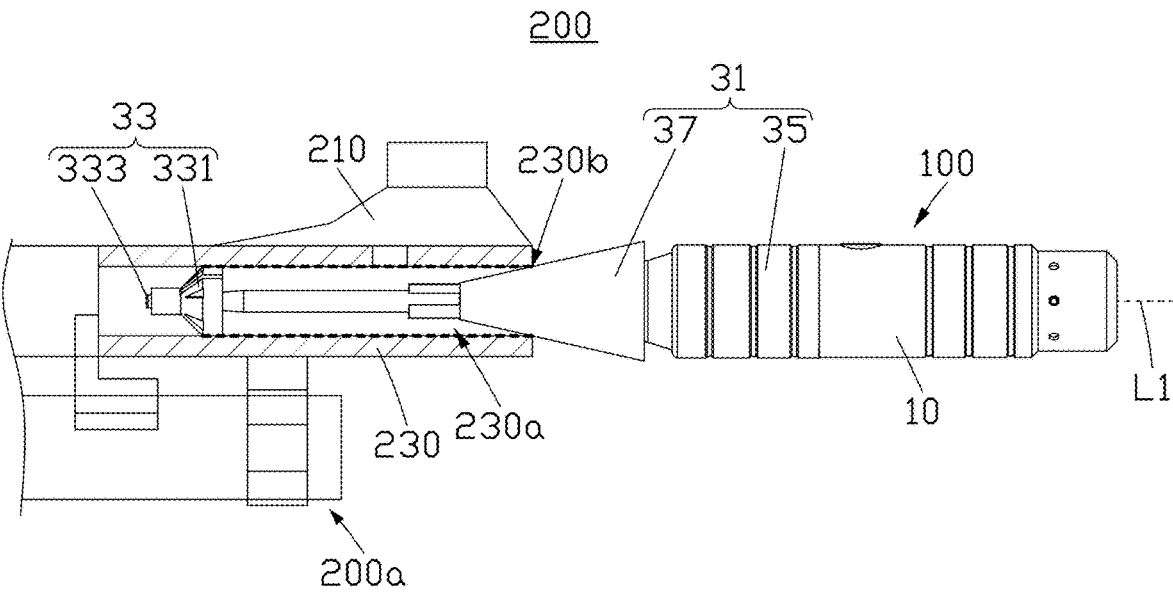
FIG. 1 is a schematic diagram of an embodiment of a laser boresighter attached to a gun barrel of a firearm calibration system of the present disclosure.

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Referring to FIGS. 1 to 6, an embodiment of the present disclosure provides a firearm calibration system 200. The firearm calibration system 200 includes a laser boresighter 100 and a firearm 200a. The firearm 200a includes a gun body 210, a gun barrel 230, and a sight 250. A bore channel 230a with an exit port 230b is defined in the gun barrel 230, the bore channel 230a extends along an extending direction, and the extending direction is parallel to a firing direction of bullets 270 fired from the gun barrel 230 toward the exit port 230b. A portion of the laser boresighter 100 is received in the bore channel 230a via the exit port 230b, and is capable of emitting a laser beam L1 toward a direction parallel to the extending direction of the bore channel 230a, so as to simulate an ideal trajectory of bullets 270 after being fired from the gun barrel 230. The laser boresighter 100 calibrates the sight 250 of the firearm 200a, and the sight 250 is aimed at a position of the shooting target to form an aiming point. When the laser boresighter 100 calibrates the sight 250, an observation is made to whether a light spot formed by the laser beam L1 emitted by the laser boresighter 100 on the shooting target coincides with the aiming point of the sight 250. If the aiming point of the sight 250 does not coincide with the light spot of the laser beam L1, this indicates that the aiming point of the sight 250 is deviated from the laser beam L1 of the laser boresighter 100, and therefore an adjustment to the position of the sight 250 is required until the aiming point coincides with the light spot of the laser beam L1. If the aiming point of the sight 250 coincides with the light spot of the laser beam L1, it indicates that the firearm 200a of the firearm calibration system 200 has been successfully calibrated.

FIRST EMBODIMENT

Figure 2:
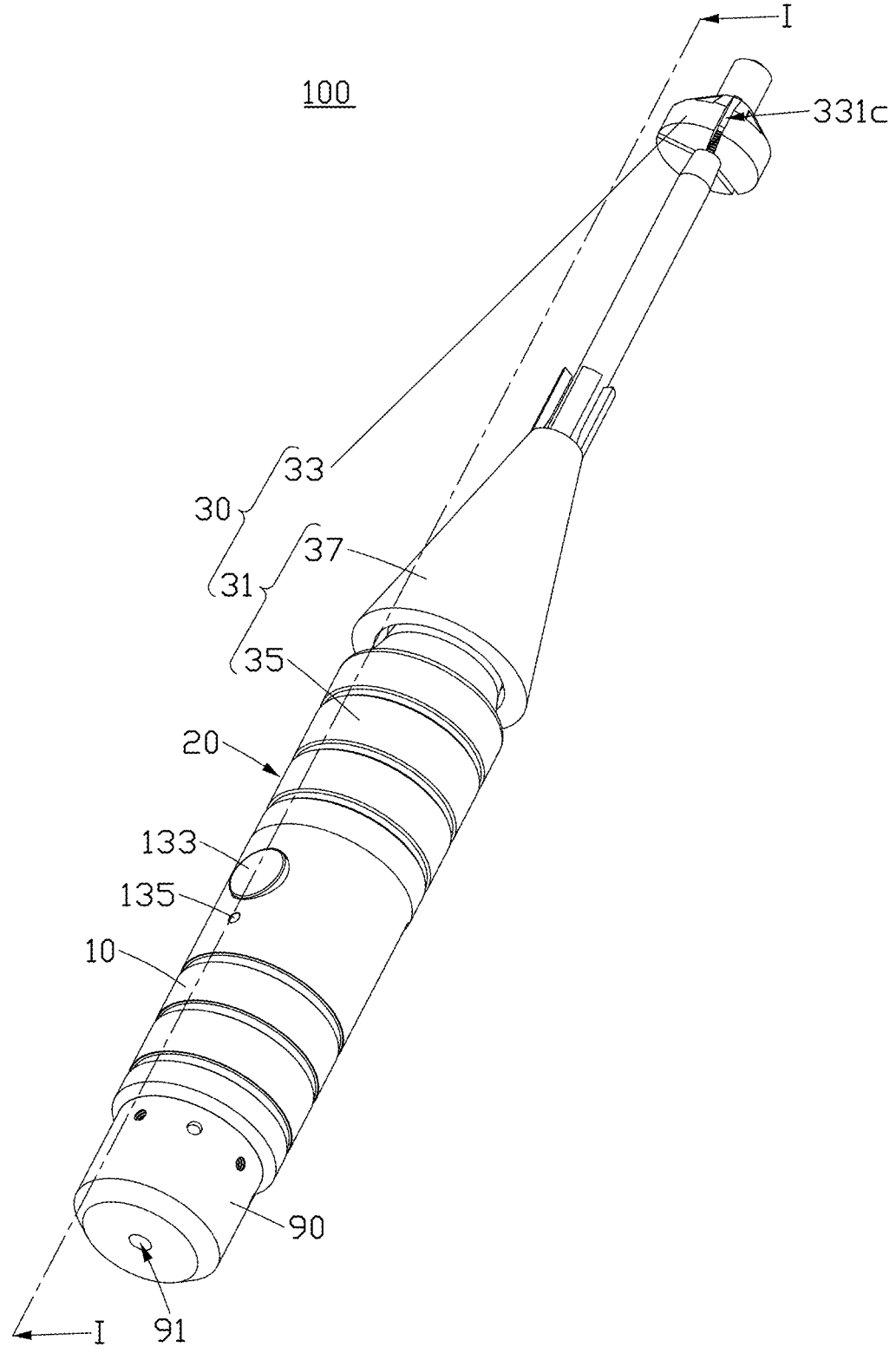
FIG. 2 is a schematic diagram of the laser boresighter shown in FIG. 1. The laser boresighter includes a main body and a mounting cover detachably attached to the main body.
Figure 3:
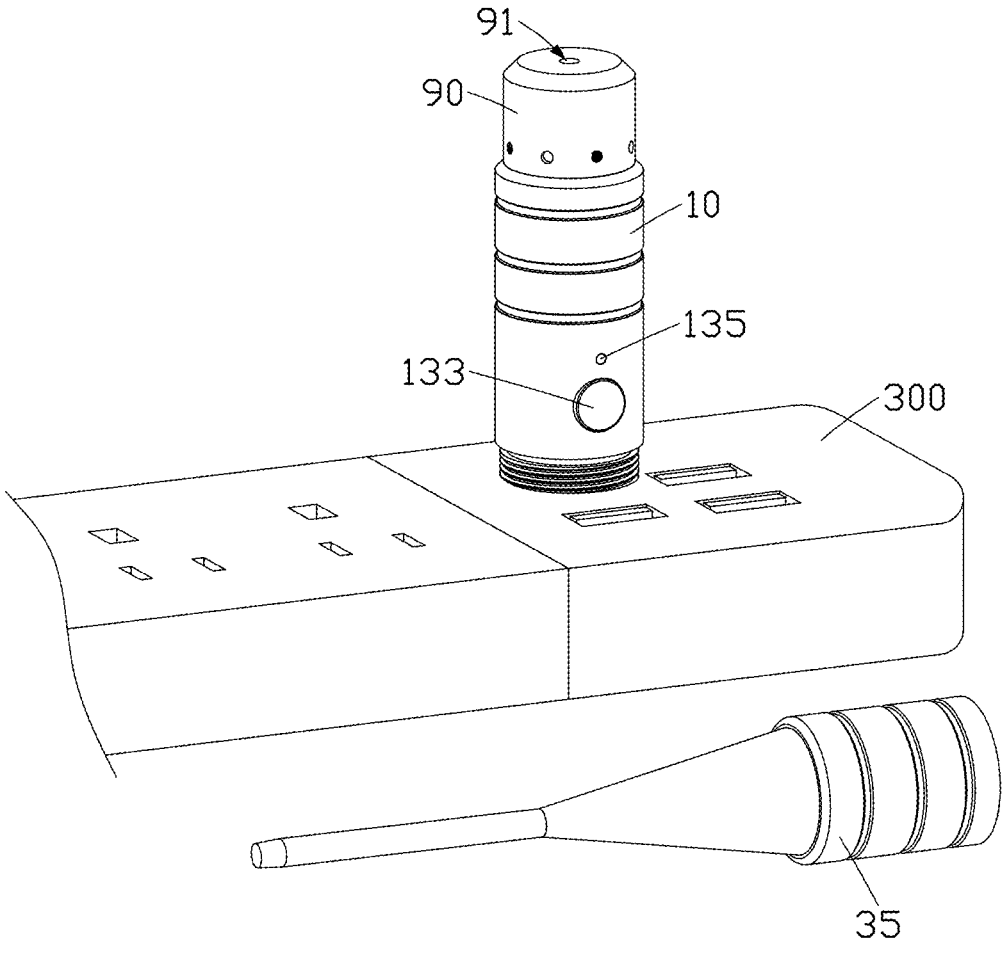
FIG. 3 is a schematic diagram showing an end of the main body inserted into a socket to charge shown in FIG. 2.

Referring to FIG. 2 and FIG. 3, a laser boresighter 100, especially a built-in charging boresighter is provided. The charging function of the built-in charging boresighter is realized by plugging it into a female connector, which in turn connects to an external power supply, such as a socket 300, a USB port of a tablet computer, a car charging interface and so on. The laser boresighter 100 can be charged by directly inserted into the female connector without connecting a charging cable.

Figure 4:
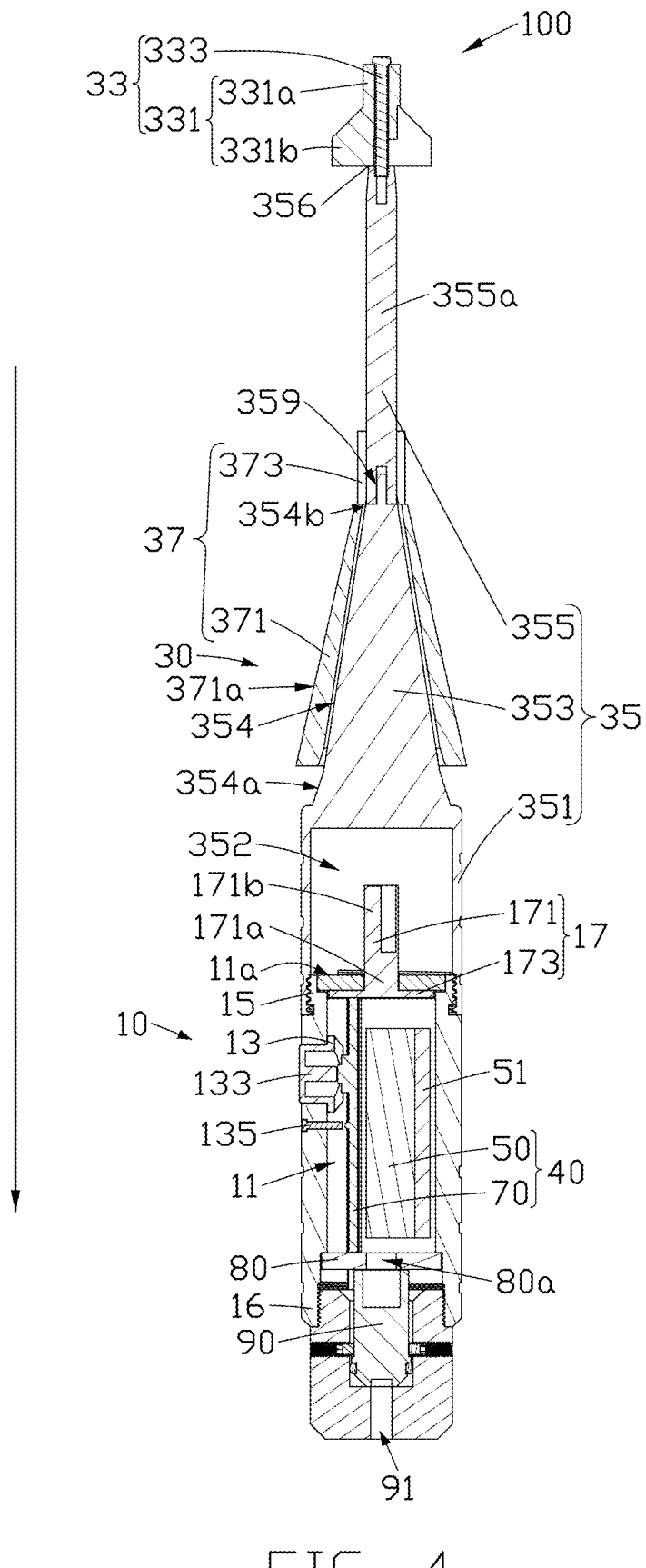
FIG. 4 is a schematic cross-sectional view taken along directions I-I in FIG. 2.

Referring also to FIG. 4, the laser boresighter 100 includes a main body 20, a mounting cover 30 and a laser light generator 90. The mounting cover 30 detachably covers an end of the main body 20, and is insertable into the bore channel 230a of the gun barrel 230 and abutted against an inner wall of the gun barrel 230 (refer to FIG. 1). Another end of the main body 20 is configured to connect the laser light generator 90 and emit the laser beam L1 generated from the laser light generator 90.

The main body 20 includes a housing 10 and a power supply module 40. The power supply module 40 includes a storage element 50 and a circuit board 70. The storage element 50, the circuit board 70, and a portion of the laser light generator 90 are cooperatively received in the housing 10, and the storage element 50, the circuit board 70, and the laser light generator 90 are electrically connected in turn. In some embodiments, the storage element 50 can be a built-in battery, capacitor, a cooperation of a battery and an ultra-capacitor. In this embodiment, the storage element 50 may be a battery 50.

The housing 10 has a cylindrical shape with one end protruding along its length direction, and the length direction is parallel to the extending direction of the bore channel 230a. A receiving space 11 with an opening 11a is defined in the housing 10. The battery 50, the circuit board 70, and a portion of the laser light generator 90 are received in the receiving space 11.

Figure 5:
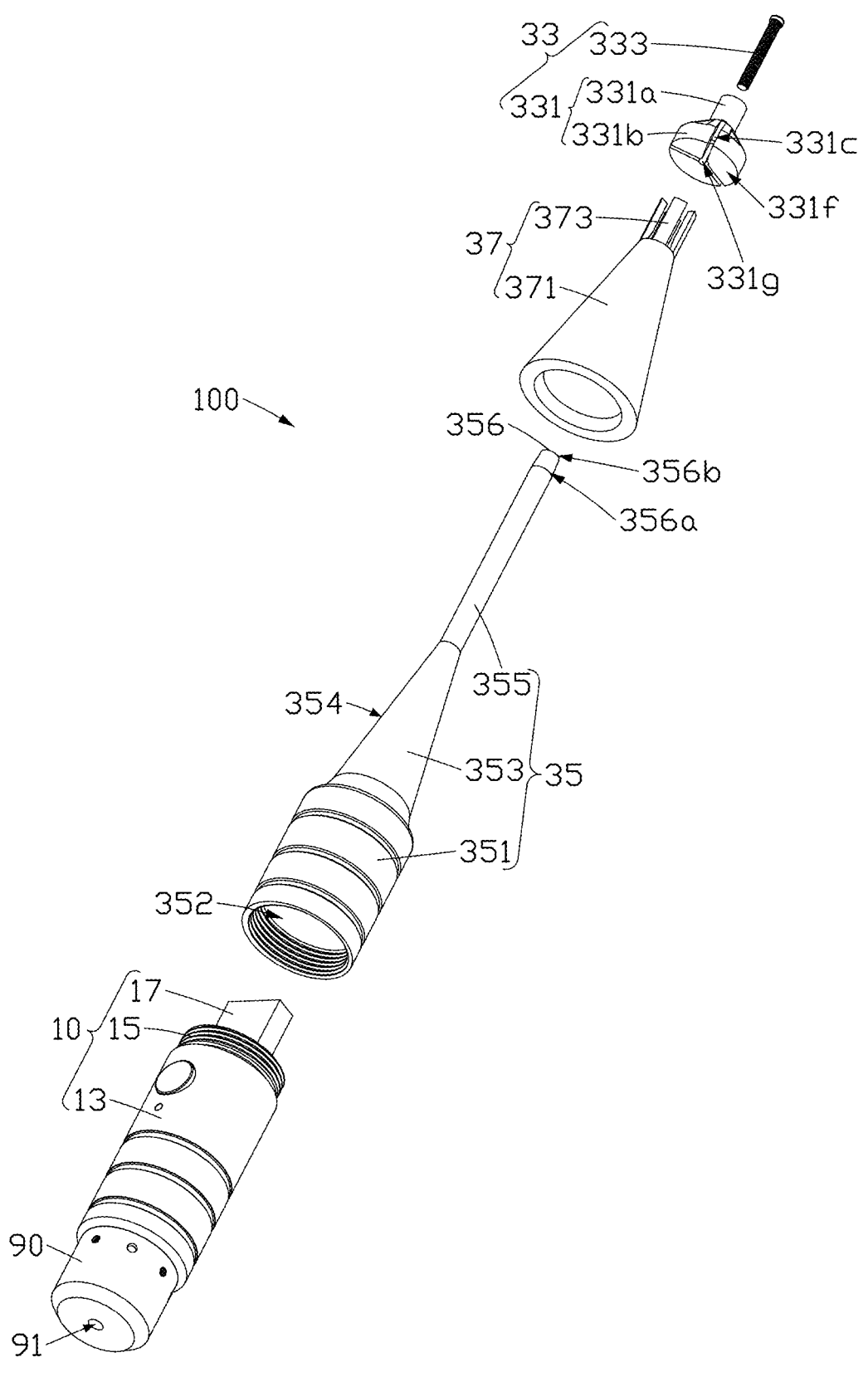
FIG. 5 is an exploded view of the laser boresighter shown in FIG. 2.

Referring to FIG. 4 and FIG. 5, the housing 10 includes a handle portion 13, a first connecting portion 15, a second connecting portion 16, and a charging port 17. The first connecting portion 15 and the second connecting portion 16 are located at two opposite ends of the handle portion 13, respectively. The charging port 17 protrudes and extends from one end of the first connecting portion 15. The second connecting portion 16 acts as a first side of the housing 10, and the first connecting portion 15 acts as a second side of the housing 10, the first side is disposed opposite the second side. The laser light generator 90 is located the first side of the housing 10 and configured to generate and emit a laser beam L1 out along a direction from the second side to the first side, the direction is parallel to the length direction of the housing 10.

The first connecting portion 15 is positioned between the handle portion 13 and the charging port 17, the first connecting portion 15 and the handle portion 13 cooperate to define the receiving space 11, and the opening 11a of the receiving space 11 is defined in the first connecting portion 15. The handle portion 13 is configured for being held by a user's hand, the first connecting portion 15 is configured for *atta* ching to the mounting cover 30, the charging port 17 can be directly inserted into the female connector of the socket 300 to charge the main body 20 when the mounting cover 30 is separated from the first connecting portion 15, and the second connecting portion 16 is configured for connecting the laser light generator 90.

The second connecting portion 16 is detachably attached to the laser light generator 90. A button 133 protrudes on an outer side wall of the handle portion 13, one end of the button 133 is received in the receiving space 11 and is electrically connected to the circuit board 70, so as to control an emission of the laser beam L1 of the laser light generator 90. When the mounting cover 30 is inserted into the gun barrel 230, the button 133 is pressed by the user to turn on and emit the laser beam L1 generated by the laser light generator 90.

A light 135 is installed on the outer side wall of the handle portion 13 to indicate a power level of the battery 50. The light 135 displays various colors, using an intensity of each color to convey status information of the light 135.

The first connecting portion 15 protrudes and extends from one end of the handle portion 13 along the length direction of the housing 10. First threads are formed on an outer periphery of the first connecting portion 15, and the first connecting portion 15 connects with the mounting cover 30 through the first threads.

In some embodiments of the present disclosure, the charging port 17 can be for example a USB charging port, which includes a USB male connector 171 and a control board 173. The control board 173 is received in the receiving space 11, seals the opening 11a of the receiving space 11, and is welded and connected with the circuit board 70. The USB male connector 171 is installed at one end of the first connecting portion 15 away from the handle portion 13, and includes a first end and a second end arranged opposite to the first end. The first end 171a of the USB male connector 171 passes through the opening 11a of the receiving space 11 of the first connecting portion 15, is received in the receiving space 11, and is electrically connected with the control board 173. The second end 171b of the USB male connector 171 protrudes from the first connecting portion 15 and extends toward the mounting cover 30 along the length direction of the housing 10. The second end 171b functions as a connecting end and is directly insertable into the female connector of the socket 300, and transmits power to the battery 50. In this embodiment, the handle portion 13, the first connecting portion 15, and the USB male connector 171 are arranged in a stepped shape. Since the USB male connector 171 is provided in the main body 20, the USB male connector 171 is directly inserted into the female connector of the external power supply, so that the main body 20 can be charged directly without a charging cable. The charging port 17, the battery 50, and the circuit board 70 together form a charging module.

In some other embodiments, the charging port 17 is a male connector, and the male connector may be a type-c charging port, or a pair of electrical pins, as long as the charging port 17 has a connection end that is exposed out of the housing 10 and can be directly connect to the female connector of the external power supply.

The battery 50 is received in the receiving space 11 and is electrically connected to the circuit board 70. An outer surface of the battery 50 is covered with a protective sleeve 51, which is made of an ethylene vinyl acetate copolymer material. The protective sleeve 51 serves as an insulating layer to prevent the battery 50 from leaking electricity and short-circuiting.

The laser light generator 90 is detachably attached to the second connecting portion 16, one end of which is received in the receiving space 11 of the housing 10 and is electrically connected with the circuit board 70, and another end of which protrudes from the housing 10 and defines an emission port 91. The laser beam L1 emitted by the laser light generator 90 is emitted toward the shooting target through the emission port 91. In this embodiment, the laser light generator 90 is a laser, and the USB male connector 171 and the emission port 91 are arranged along an imaginary line.

The laser light generator 90 is located on a side of the battery 50, and the laser light generator 90 and the battery 50 are separated by a spaced plate 80. A through hole 80a is defined on the spaced plate 80, and electric wires of the laser light generator 90 connect with the circuit board 70 via the through hole 80a.

The mounting cover 30 includes a connecting element 31 and an expanding component 33. The expanding component 33 is capable of actively increasing its surface area under an external force, and then stably abut against the inner wall of the gun barrel 230 to achieve positioning functions. The expanding component 33 may be a limit protrusion, a circlip, a reference gauge plate and so on. One end of the connecting element 31 has second threads engaged with the first threads, and the connecting element 31 connects with the first connecting portion 15 of the housing 10 via the first threads and the second threads, another end of the connecting element 31 is detachably attached to the expanding component 33. When the laser boresighter 100 is partly received in the gun barrel 230 via the exit port 230b, the expanding component 33 and the connecting element 31 abut against an inner side wall of the bore channel 230a of the gun barrel 230, so as to fix the laser boresighter 100 to the gun barrel 230.

The connecting element 31 includes an arbor 37 and an cover 35. The arbor 37 sleeves on an outer periphery of the cover 35 and is configured for being abutted against the inner side wall of the bore channel 230a of the gun barrel 230. The cover 35 has an elongated funnel shape, and extends along the extending direction of the bore channel 230a.

The cover 35 includes a cover portion 351, a fixing tube 353, and an extending rod 355. The fixing tube 353 is located between the cover portion 351 and the extending rod 355, and is fixedly connected with the cover portion 351 and the extending rod 355. The fixing tube 353 and the extending rod 355 together form a mounting end, and the mounting end is configured to engage the cover 35 inside the gun barrel 230.

Referring to FIG. 4 and FIG. 5, the cover portion 351 is a cylindrical shape, and has a hollow structure to form an accommodating space 352. The second threads are formed on an inner side wall of the cover portion 351, and the cover portion 351 connects with the first connecting portion 15 of the housing 10 via the second threads, and the USB male connector 171 is received in the accommodating space 352 after the cover portion 351 attaches to the housing 10.

The fixing tube 353 is a conical shape, and a first contact surface 354 is formed on an outer surface of the fixing tube 353 for abutting against an inner side wall of the connecting element 31. In detail, the first contact surface 354 includes a first end surface 354a and a second end surface 354b arranged opposite to the first end surface 354a, and a cross-sectional area of the first contact surface 354 gradually decreases from the first end surface 354a to the second end surface 354b. In this embodiment, when the fixing tube 353 and the extending rod 355 are inserted into the gun barrel 230 along the extending direction of the bore channel 230a, the second end surface 354b is received in the inner side wall of the bore channel 230a of the gun barrel 230, while the first end surface 354a is exposed outside the gun barrel 230. In other embodiments, the fixing tube 353 is completely received in the bore channel 230a and abutted against an inner side wall of the gun barrel 230.

A mounting rod 359 is protruded from a side of the fixing tube 353 away from the cover portion 351, and the mounting rod 359 can be inserted into the extending rod 355 and fixedly connected with the extending rod 355.

The extending rod 355 is extended from one end of the fixing tube 353 along the extending direction of the bore channel 350a. An insertion space 355a with two first openings is defined in the extending rod 355, and the two first openings are in communication with an external environment. The mounting rod 359 is inserted into one of the two first openings and fixedly connected with the extending rod 355. A cross-sectional size of an end of the extending rod 355 away from the fixing tube 353 gradually decreases along the extending direction of the bore channel 230a to form a tapered end 356, which is convenient for the expanding component 33 to be inserted. The tapered end 356 has a first end 356a and a second end 356b opposite to the first end 356a, the first end 356a is located near the fixing tube 353, while the second end is located away from the fixing tube 353. A cross-sectional size of the tapered end 356 from the first end 356a to the second end 35b gradually decreases. In some embodiments, the cover portion 351, the fixing tube 353, and the extending rod 355 are integrally formed.

The arbor 37 has a hollow structure and covers an outer side wall of the cover 35. The arbor 37 includes a connecting end 371 and a mounting end 373. The connecting end 371 has a conical shape, and a cross-sectional area of the connecting end 371 is slightly larger than that of the fixing tube 353 to cover the first contact surface 354 of the fixing tube 353. A second contact surface 371a is formed on an outer surface of the connecting end 371 for contacting and abutting against the inner side wall of the gun barrel 230. The mounting end 373 is protruded from one end of the connecting end 371, and has a cylindrical shape. A cross-sectional area of the mounting end 373 is smaller than that of the connecting end 371 and that of the fixing tube 353, and covers a portion of an outer side wall of the extending rod 355. A plurality of gaps are defined on the mounting end

373 along the extending direction of the bore channel 230a, and the plurality of gaps divide the mounting end 373 into a plurality of parts. When the arbor 37 is sleeved on the outer side wall of the cover 35, the mounting end 373 is sleeved on a part of the extending rod 355, and the connecting end 371 covers and contacts with the first contact surface 354.

In some embodiments of the present disclosure, the arbor 37 covers on the outer side wall of the cover 35 to increase an overall outer diameter of the connecting element 31, enabling the outer diameter of the connecting element 31 to correspond to a large size inner diameter of the gun barrel 230. This facilitates the second contact surface 371a of the arbor 37 to abut against the inner side wall of the gun barrel 230 when the connecting element 31 is inserted into the bore channel 230a of the gun barrel 230. In another embodiment, the connecting element 31 only includes the cover 35, with no arbor 37 installed. When the outer side wall of the cover 35 abuts against the inner side wall of the gun barrel 230, the arbor 37 may be omitted. The expanding component 33 is connected to the tapered end 356 of the extending rod 355. In this embodiment, the expanding component 33 includes an adapter 331 and a locking member 333. The adapter 331 covers on an outer side wall of the tapered end 356 and is configured to engage with the arbor 37, so as to abut against the inner wall of the gun barrel 230, and the locking member 333 passes through the adapter 331 and is inserted into one of the two first openings of the extending rod 355. The adapter 331 includes an expanding end 331b and a locking end 331a integrally formed. The locking end 331a and the expanding end 331b cooperate to form a through space. The expanding end 331b covers and compresses the outer side wall of the tapered end 356 of the extending rod 355, and the locking end 331a is located on one side of the expanding end 331b and fixed outside the extending rod 355.

A plurality of slits 331c are defined on the expanding end 331b along the extending direction of the bore channel 230a, each pair of the plurality of slits 331c defines one expanding portion 331f therebetween. The expanding portions 331f define an insertion opening 331g to insert into the tapered end 356, and the insertion opening 331g is in air communication with the plurality of slits 331c. A cross-sectional size of the insertion opening 331g is substantially equal to that of second end 356b of the tapered end 356 but smaller than that of the first end 356a of the tapered end 356. Therefore, when the expanding end 331b moves toward the tapered end 356 from the second end 356b to the first end 356a and compresses the outer side wall of the tapered end 356, the expanding portions 331f are forced to expand and a size of the plurality of slits 331c become larger, so that an outer diameter of the expanding end 331b increases, capable of abutting against the inner side wall of the gun barrel 230 having a large inner diameter.

In this embodiment, the locking member 333 may be a screw, and the locking member 333 passes through the through space of the adapter 331 and is inserted into the insertion space 355a of the extending rod 355. When the locking member 333 moves toward the insertion space 355a of the extending rod 355 under an external force, the adapter 331 is driven to move toward the tapered end 356, squeezing the outer side wall of the tapered end 356, and the size of the plurality of slits 331c of the expanding end 331b are forced to increase and make the expanding portions 331f of the expanding end 331b expanded outward, and an outer diameter of the adapter 331 increases to abut against the inner side wall of the gun barrel 230. When the outer diameter of the adapter 331 is not adapted to the inner diameter of the gun barrel 230, the outer diameter of the adapter 331 can be adjusted by tightening or loosening the locking member 333.

When charging the laser boresighter 100, firstly, the USB male connector 171 is inserted into the female connector of the socket 300 to store electricity for the battery 50 received in the main body 20, after the battery 50 is fully charged, the USB male connector 171 is detached from the socket 300, and the mounting cover 30 is thread with first connecting portion 15, allowing the USB male connector 171 received in the accommodating space 352 of the cover 35.

When using the laser boresighter 100, firstly, the arbor 37 is moved toward one end of the extending rod 355 along the extending direction of the bore channel 230a and covered the first contact surface 354 of the cover 35. Secondly, the adapter 331 covers the outer side wall of the tapered end 356 of the extending rod 355, and tighten the locking member 333, so that the adapter 331 squeezes the outer side wall of the tapered end 356, and the expanding portions 331f of the expanding end 331b are forced to expand until the overall outer diameter of the connecting element 31 matches the inner diameter of the gun barrel 230 simultaneously. Then, the cover portion 351 is threadedly connected to the first connecting portion 15 of the housing 10. Finally, the laser boresighter 100 is partly inserted into the gun barrel 230, and the outer side wall of the adapter 331 and the second contact surface 371a of the arbor 37 cooperate to abut against the inner side wall of the gun barrel 230.

The laser boresighter 100 of this embodiment is equipped with a USB male connector 171, which can be inserted into a female connector of the socket 300, for quick charging without tangle cords. Moreover, after charging is completed, the USB male connector 171 can be received in the cover portion 351 without being exposed to air.

APPLICATION EMBODIMENT

Figure 6:
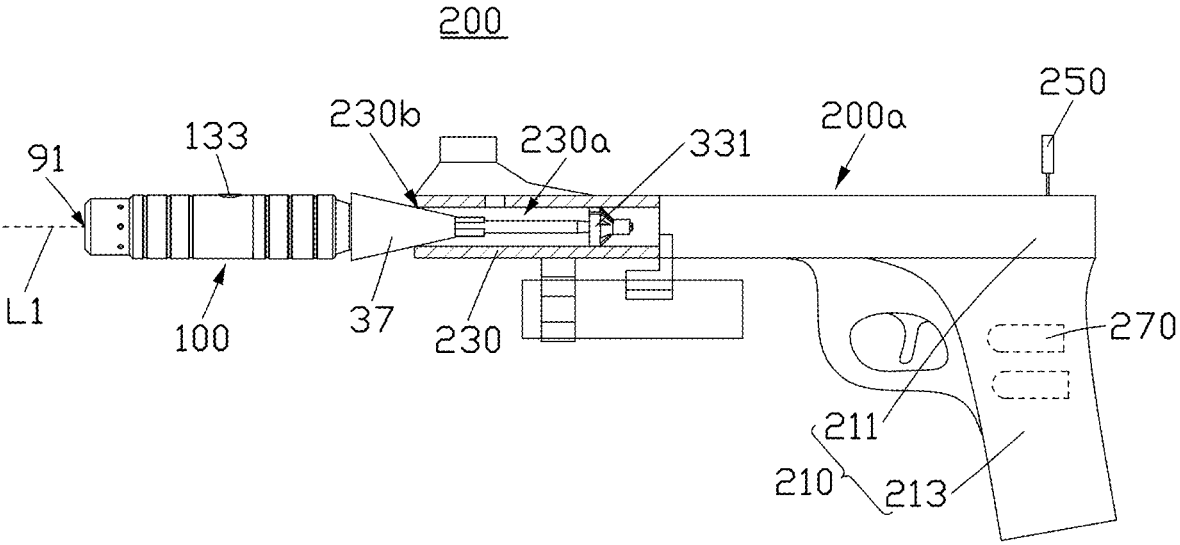
FIG. 6 is a partial cross-sectional view illustrating an application embodiment of a firearm calibration system using the laser boresight of FIG. 1.

As shown in FIG. 6, an embodiment of the present disclosure provides a firearm calibration system 200. The firearm calibration system 200 includes a firearm 200a and the laser boresighter 100 of the first embodiment.

The firearm 200a includes the gun body 210, the gun barrel 230 and the sight 250. The gun body 210 includes a breech cover 211 and a handle 213. The breech cover 211 and the handle 213 are arranged at an obtuse angle, and the breech cover 211 is movable relative to the handle 213. A magazine is defined in the handle 213 for storing the bullets 270. The gun barrel 230 is formed in the breech cover 211 and is configured to receive the bullets 270 from the handle 213. The sight 250 is located at an end of the breech cover 211.

The bore channel 230a is defined in the gun barrel 230, and one end of the bore channel 230a defines the exit port 230b configured for firing the bullets 270 and being inserted by the laser boresighter 100, and the exit port 230b is in air communication with the bore channel 230a.

The firearm 200a needs to be calibrated before use. First, the laser boresighter 100 is inserted into the bore channel 230a via the exit port 230b, and the adapter 331 and a portion of the arbor 37 of the laser boresighter 100 are fixed on the inner side wall of the gun barrel 230. The main body 20 of the laser boresighter 100 blocks the exit port 230b of the gun barrel 230, and the emission port 91 of the laser light generator 90 is arranged opposite to the exit port 230b. When the firearm 200a moves, the laser boresighter 100 does not move but remains fixed on the inner side wall of the gun barrel 230. Then, the button 133 of the laser boresighter 100 is pressed, the laser beam L1 emitted from the laser boresighter 100 is emitted from the emission port 91, aimed at the shooting target, and forms the light spot at the shooting target to locate a specific coordinate of the firearm 200a. Then, the laser boresighter 100 is slowly taken out. Next, the breech cover 211 is pulled backward and a trigger of the handle 214 is then pulled to shoot at the shooting target. Alternatively, the observation is made to whether the light spot of the laser beam L1 coincides with the aiming point of the sight 250. If the light spot coincides with the aiming point, it means that the firearm 200a is successfully calibrated by the laser boresighter 100, and the laser boresighter 100 is taken out from the exit port 230b.

What is claimed is:

1. A laser boresighter, insertable into a gun barrel of a firearm, comprising:
    a main body, comprising
        a housing comprising a first side and a second side opposite the first side,
        a laser light generator located the first side of the housing and configured to generate and emit a laser light beam out along a direction from the second side to the first side, and
        a charging module partly received in the housing and electrically connected to an external power supply, the charging module comprising
            a male connector configured to directly connect to a female connector of the external power supply and located on the second side of the housing, a connecting end of the male connector extending to an exterior of the housing; and
            a storage element received in the housing and chargeable by the external power supply via the male connector, and configured to supply power to the laser boresighter; and
    a cover, detachably coupled to the connecting end of the male connector and comprising a mounting end extending along the direction from the second side to the first side, the mounting end configured to engage the cover with an interior of the gun barrel;
    wherein, the male connector comprises a USB male connector, and the connecting end of the USB male connector protrudes from the second side of the housing along the direction from the first side to the second side.

2. The laser boresighter according to claim 1, wherein the charging module further comprises a control board received in the housing, and the control board is mechanically and electrically connected to the male connector.

3. The laser boresighter according to claim 1, wherein the cover further comprises a cover portion configured to engage with the second side of the housing, and an accommodating space is defined in the cover portion, the accommodating space is configured for receiving the connecting end of the male connector.

4. The laser boresighter according to claim 3, wherein the mounting end comprises a fixing tube and an extending rod, the fixing tube is located between the cover portion and the extending rod and connected to the cover portion and the extending rod, and
    the extending rod extends along the direction from the first side to the second side, the extending rod, cooperating with the fixing tube, is insertable into the firearm and fixed to an inner side wall of the gun barrel of the firearm.

5. The laser boresighter according to claim 4, wherein cover portion, the fixing tube and the extending rod are arranged in a stepped shape.

6. The laser boresighter according to claim 5, wherein a first contact surface is formed on the fixing tube and configured for contacting with the inner side wall of the gun barrel, the first contact surface includes a first end surface and a second end surface arranged opposite to the first end surface, a cross-sectional area of the first contact surface gradually decreases from the first end surface to the second end surface along the direction from the first side to the second side, the second end surface is received in the inner side wall of the gun barrel, and the first end surface is exposed outside the gun barrel in a case that the cover is partially received in the gun barrel.

7. The laser boresighter according to claim 4, further comprising an arbor sleeved on an outer side wall of the fixing tube, wherein the arbor, cooperating with the cover, is insertable into the gun barrel, a second contact surface is formed on an outer surface of the arbor, the second contact surface configured for contacting the inner side wall of the gun barrel.

8. The laser boresighter according to claim 1, further comprising an adapter and a locking member, wherein the adapter is fixed at the mounting end of the cover through the locking member, the adapter, cooperating with the at least one part of the cover, is insertable into the gun barrel, and an outer periphery of the adapter is configured to abut against an inner side wall of the gun barrel.

9. The laser boresighter according to claim 8, wherein the mounting end is a tapered end configured to be sleeved by the adapter, a cross-sectional area of the tapered end gradually increases along the direction from the first side to the second side, a plurality of slits are defined on a side of the adapter close to the tapered end, the plurality of slits is expanded in response that the adapter is sleeved on an outer side wall of the tapered end and moves toward the housing along the direction from the second side to the first side.

10. The laser boresighter according to claim 1, further comprising a spaced plate received in the main body and configured to separate the laser light generator and the charging module.

11. The laser boresighter according to claim 10, wherein the charging module comprises a circuit board, a through hole is defined on the spaced plate, and wires of the laser light generator are electrically connected to the circuit board through the through hole.

12. A laser boresighter, comprising:

a main body, comprising a power supply module, a USB male connector and a control board, wherein the main body has a first side and a second side opposite to the first side, the control board is received in the main body and electrically connected to the power supply module, one end of the USB male connector extends through the main body and electrically connected to the control board, and another end of the USB male connector protrudes to an exterior of the main body and configured for directly connecting to a female connector of an external power supply, the another end of the USB male connector protrudes from the second side of the main body along a direction from the first side to the second side;

a laser light generator, detachably connected to one end of the main body and electrically connected to the power supply module, the laser light generator configured to emit laser beams, a cover, arranged opposite to the laser light generator and connected to another end of the main body.

13. The laser boresighter according to claim 12, wherein the main body further comprises a handle portion and a first connecting portion integrally formed with the handle portion, the first connecting portion is located between the handle portion and the USB male connector, and configured to detachably attach to the cover, the handle portion is configured to be held by a user, the handle portion, the first connecting portion and the USB male connector are not arranged on a horizontal line.

14. The laser boresighter according to claim 12, wherein the cover comprises a contact surface configured to contact an inner side wall of a gun barrel, and a cross-sectional area of the contact surface gradually decreases from a first end adjacent to the main body to a second end away from the main body.

15. The laser boresighter according to claim 14, further comprising an adapter configured to attach to the cover, wherein a tapered end is formed at an end of the cover away from the main body, a cross-sectional area of the tapered end gradually decreases toward a direction away from the main body, one end of the adapter is sleeved on the tapered end and squeezed an outer wall of the tapered end.

16. The laser boresighter according to claim 15, wherein a slit is defined in the adapter and configured to divide the adapter into two expanding portions, in response that the adapter moves toward the main body and is sleeved on the tapered end, the slit is expanded, and a distance between the two expanding portions is enlarged.

17. The laser boresighter according to claim 16, wherein an outer wall of the adapter and a portion of the contact surface of the cover are arranged in a virtual line, and the virtual line overlaps with the inner side wall of the gun barrel.

18. The laser boresighter according to claim 14, further comprising an arbor covered on the contact surface of the cover, wherein an outer wall of the arbor is configured to contact and abut against a gun barrel having a larger inner diameter than an inner diameter of the gun barrel.

19. A laser boresighter, comprising:

a main body, comprising a power supply module, a USB male connector and a control board, wherein the control board is received in the main body and electrically connected to the power supply module, one end of the USB male connector extends through the main body and electrically connected to the control board, and another end of the USB male connector protrudes to an exterior of the main body and configured for directly connecting to a female connector of an external power supply;

a laser light generator, detachably connected to one end of the main body and electrically connected to the power supply module, the laser light generator configured to emit laser beams;

a cover, arranged opposite to the laser light generator and connected to another end of the main body; and an adapter, configured to attach to the cover;

wherein, the cover comprises a contact surface configured to contact an inner side wall of a gun barrel, and a cross-sectional area of the contact surface gradu-
ally decreases from a first end adjacent to the main
body to a second end away from the main body, a tapered end is formed at an end of the cover away from
the main body, a cross-sectional area of the tapered end
gradually decreases toward a direction away from the
main body, one end of the adapter is sleeved on the
tapered end and squeezes an outer wall of the tapered
end.

\* \* \* \* \*